United States Patent Office 3,521,233
Patented July 21, 1970

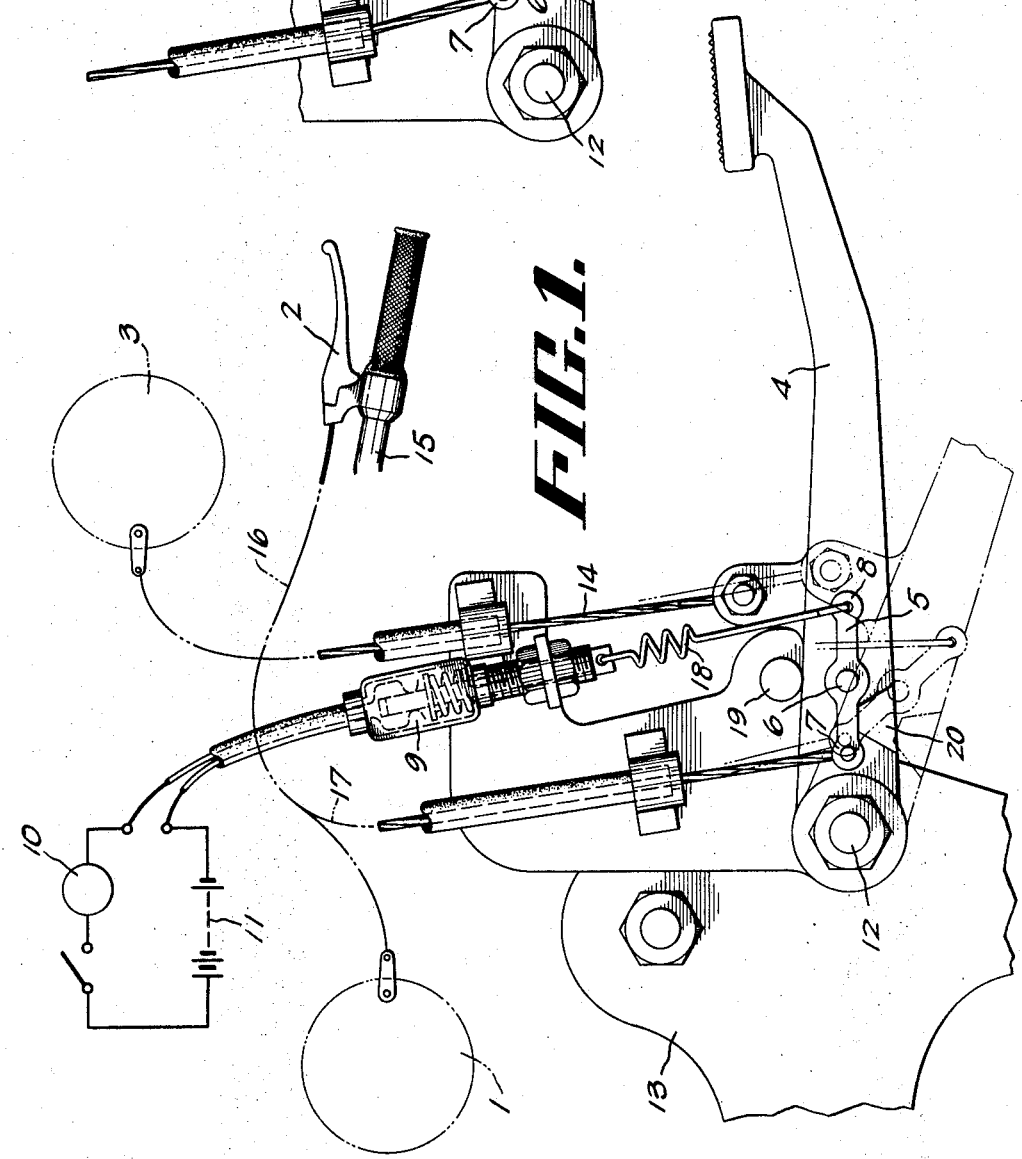

3,521,233
BRAKE INDICATING APPARATUS FOR A MOTORIZED TWO WHEEL VEHICLE
Takeshi Inoue, Tokyo, Japan, assignor to Kabushiki Kaisha Honda Gijutsu Kenkyusho, Yamato-machi, Japan
Filed Mar. 21, 1968, Ser. No. 714,881
Claims priority, application Japan, Mar. 28, 1967, 42/26,147
Int. Cl. B60q 1/44; B62j 5/00
U.S. Cl. 340—71           9 Claims

ABSTRACT OF THE DISCLOSURE

A brake indicator includes a control lever pivotably connected to a pedal actuator for the brakes of one wheel of a motorized two wheel vehicle. A cable of a second actuator for the brakes of the other wheel is connected to one end of the lever whereas a switch, which controls an electrical circuit with an indicator, is connected to the other end of the lever via a spring.

BRIEF SUMMARY OF THE INVENTION

The present invention relates to a brake indicating apparatus which indicates not only when the rear wheel of a motorized two-wheel vehicle is braked but also when the front wheel thereof is braked.

An object of the invention is to simplify the electrical wiring of a brake lamp and decrease rear-end collision accidents.

A known brake indicating apparatus for a motorized two-wheel vehicle includes a brake lamp which is operative only at the time of operation of the rear wheel brake mechanism. It is desirable, however, for prevention of rear-end collisions, to light the brake lamp also at the time when the vehicle is being stopped by a front wheel braking action alone.

Thus, another object of the invention is to provide brake indicating apparatus having a lamp which is lighted when either or both brake mechanisms are operated.

In accordance with the invention there is provided a brake indicating mechanism which includes control means coupled to both brake actuator mechanisms and to a switch means, which controls a circuit containing an indicator lamp, such that upon operation of either or both actuators, the switch means is closed and the lamp lighted, the control means being so constructed to permit independent operation of either actuating means.

In a preferred embodiment, the control means is constituted as a lever pivotably connected to a pedal serving as the actuator for the brakes of one wheel, one end of the lever being connected to a cable of the actuator for the brakes of the other wheel, the other end of the lever being connected to the switch means via a spring member thereof.

BRIEF DESCRIPTION OF THE DRAWING

FIG. 1 is a side view of the brake indicating apparatus of the present invention, and FIG. 2 is a side view of the portion of the mechanism of FIG. 1 at the time when a front wheel brake is actuated.

DETAILED DESCRIPTION

In the drawing there is shown a front wheel brake 1 which is actuated by a first actuating member 2 and a rear wheel brake 3 which is actuated by a second actuating member 4. The actuating member 4 carries a lever 5 pivotably attached thereto through an intermediate shaft 6. The lever 5 is connected at one end 7 with cable 17 of the actuating member 2 and at its other end 8 to a single common electrical switch 9 via a spring 18. The electrical switch 9 is interposed in an electrical circuit which connects a brake lamp 10 with a voltage source 11.

In the illustrated embodiment, the second actuating member 4 is formed as a swingable pedal arm pivotally attached through a shaft 12 to a vehicle body frame 13. The pedal arm 4 is connected to the rear wheel brake 3 through a cable or wire 14, as is conventional, and the pedal arm 4 is provided, adjacent one of the flat side surfaces thereof in the region of the shaft 12 (where the arm 4 has a base which is comparatively large in width), with the swingable lever 5. The first actuating member 2 is formed as a lever handle disposed at the end portion of a steering handle 15 and the member 2 is connected through a cable or wire 16 with the front wheel brake 1 as is also conventional. The member 2 is also connected to the end 7 of the swingable lever 5 through wire 17 diverged from the wire 16. The end 8 of the lever 5 is connected with the movable contact of the electric switch 9 through spring 18. The spring 18 has a strength such that the spring is elongated only after the switch 9 is closed by the downward movement of the end 8 of lever 5. Numeral 19 denotes a stop for the pedal arm 4, and numeral 20 denotes a stop for the swingable lever 5. The lever 5 is wholly disposed between shaft 12 and the location where cable 14 is connected to pedal arm 4. Cables 14 and 17, and spring 18 generally extend in the same direction from pedal arm 4.

The operation of the apparatus is as follows:

If the rear brake 3 is actuated by moving the pedal arm 4 downward, the swingable lever 5 moves together with the arm 4 as shown in dotted lines in FIG. 1, so that the spring 18 is acted on to close the switch 9, whereby the brake lamp 10 is lighted to give indication of the braking condition to a following vehicle. In the case when only the front wheel brake 1 is actuated by gripping the lever handle 2, the cable 17 is pulled by the movement of the lever handle 2 as shown in FIG. 2. The pedal arm 4 remains in its original position and the lever 5 is swung about shaft 6, whereby the spring 18 is pulled in substantially the same manner as mentioned above to close the switch 9. The same operation is effected when the front and rear wheels are simultaneously braked by operation of their respective actuator members.

In the apparatus of the invention, as described above, if either the front wheel brake 1 or the rear wheel brake 3 is operated, the single common switch 9 is closed and the common brake lamp 10 is lighted, so that the braking condition can be clearly made known to the vehicle behind. Consequently, the electric circuit for the brake lamp 10 is simplified and the desired operation of the brake lamp for actuation of either brake is achieved. Additionally, at the time when either one of the two actuating members 2 and 4 is actuated, the other member is left inoperative, whereby either the front wheel or the rear wheel alone can be braked at will by actuating those members independently.

What is claimed is:

1. Brake indicating apparatus for a motorized two-wheel vehicle having brakes on each wheel and comprising first actuating means for the brakes of one wheel, second actuating means for the brakes of the other wheel, said first and second actuating means being independently actuable to operate its respective brakes, electrical circuit means including an indicator for a braking operation, switch means controlling opening and closing of the circuit means, and means coupled to both actuating means and said switch means to close the switch means during operation of either or both actuating means while permitting independent operation of either actuating means, said means for closing the switch means comprising a lever having opposite ends, said lever being pivotably connected at a location between its ends to said first actuating means, the second actuating means being connected to one of said ends of the lever, said switch means being connected to the other of the ends of the lever.

2. Apparatus as claimed in claim 1 wherein said first actuating means comprises a pivotably mounted pedal, said lever being connected to said pedal for movement therewith.

3. Apparatus as claimed in claim 2 wherein said pedal is pivotably mounted on a frame and said lever is connected to said pedal in the region where the pedal is connected to the frame.

4. Apparatus as claimed in claim 1 wherein said second actuating means comprises a pivotable handle member, and a cable connected to the handle member for displacement thereby, said cable being connected to said one end of said lever to pivotably move the same when the handle member is operated.

5. Apparatus as claimed in claim 4 wherein said switch means includes a switch device and a control spring connected to the switch device and to the lever at said other end thereof.

6. Apparatus as claimed in claim 5 wherein said first actuating means comprises a pivotable pedal having a comparatively wide base with flat side surfaces, said lever being connected to said pedal adjacent one of said flat surfaces in the region of said base.

7. Apparatus as claimed in claim 6 comprising a pivot connecting said pedal to a frame, said first actuating means comprising a cable connected to the brakes of the associated wheel and to said pedal at a location spaced from said pivot, said lever being pivotably connected to the pedal at a location between said pivot and the connection of the cable to said pedal.

8. Apparatus as claimed in claim 7 wherein said lever is wholly disposed between the pivot and the connection of the cable to said pedal.

9. Apparatus as claimed in claim 8 wherein said cables and the spring all generally extend in the same direction from said pedal.

References Cited

UNITED STATES PATENTS

| 1,346,567 | 7/1920 | Stover. | |
| 1,417,419 | 5/1922 | Smith. | |
| 1,646,419 | 10/1927 | Peck | 200—61.89 |
| 2,674,668 | 4/1954 | Sanders | 200—61.89 |

FOREIGN PATENTS

| 1,104,933 | 6/1955 | France. |
| 1,110,759 | 10/1955 | France. |

THOMAS B. HABECKER, Primary Examiner

K. N. LEIMER, Assistant Examiner

U.S. Cl. X.R.

200—61.12, 61.89; 340—134